United States Patent
Seshadri et al.

(10) Patent No.: US 10,477,400 B2
(45) Date of Patent: Nov. 12, 2019

(54) FORBIDDEN NETWORK LIST MANAGEMENT

(71) Applicant: QUALCOMM Incorporated, San Diego, CA (US)

(72) Inventors: Swathi Seshadri, San Diego, CA (US); Cogol Tina, Mission Viejo, CA (US); Abhishek Bhatnagar, San Diego, CA (US); Mona Agrawal, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 16/031,803

(22) Filed: Jul. 10, 2018

(65) Prior Publication Data

US 2019/0053054 A1 Feb. 14, 2019

Related U.S. Application Data

(60) Provisional application No. 62/543,473, filed on Aug. 10, 2017.

(51) Int. Cl.
*H04M 1/66* (2006.01)
*H04W 12/08* (2009.01)
(Continued)

(52) U.S. Cl.
CPC .......... *H04W 12/08* (2013.01); *H04L 63/101* (2013.01); *H04W 4/021* (2013.01);
(Continued)

(58) Field of Classification Search
CPC ..... H04W 48/16; H04W 48/18; H04W 48/02; H04W 60/00; H04W 12/08; H04W 48/04;
(Continued)

(56) References Cited

U.S. PATENT DOCUMENTS

2015/0117184 A1* 4/2015 Youtz .................... H04W 76/18
370/230
2015/0257044 A1* 9/2015 Jiang ...................... H04W 8/12
455/433

(Continued)

FOREIGN PATENT DOCUMENTS

WO 2017135702 A1 8/2017
WO 2018085427 A1 5/2018

OTHER PUBLICATIONS

3GPP (ETSI TS 124008 v13.7.0) , (Oct. 2016) (Year: 2016).*
(Continued)

*Primary Examiner* — Khalid W Shaheed
(74) *Attorney, Agent, or Firm* — Qualcomm Incorporated

(57) ABSTRACT

Methods, systems, and devices for wireless communication are described. A user equipment (UE) may be configured to include procedures to mitigate denial of service (DoS) attack by a rogue base station when the initial non-access stratum (NAS) messages between the UE and a mobility management entity (MME) is unprotected. UE may maintain a temporary forbidden network list, which resides outside a subscriber identity module (SIM), and update a forbidden network list, which resides on the SIM, only under certain conditions. For example, a visited network, from which the UE receives a reject message, may be added to the forbidden network list on the SIM only when a counter associated with the visited network is equal to a maximum counter value, which is configured by the UE.

32 Claims, 4 Drawing Sheets

(51) Int. Cl.

| | |
|---|---|
| *H04L 29/06* | (2006.01) |
| *H04W 48/16* | (2009.01) |
| *H04W 60/00* | (2009.01) |
| *H04W 12/12* | (2009.01) |
| *H04W 12/00* | (2009.01) |
| *H04W 4/021* | (2018.01) |
| *H04W 48/04* | (2009.01) |
| *H04W 48/02* | (2009.01) |
| *H04W 8/18* | (2009.01) |
| *H04W 48/18* | (2009.01) |
| *H04W 12/06* | (2009.01) |
| *H04W 8/06* | (2009.01) |

(52) U.S. Cl.
CPC ... *H04W 12/0027* (2019.01); *H04W 12/1202* (2019.01); *H04W 48/16* (2013.01); *H04W 60/00* (2013.01); *H04W 8/06* (2013.01); *H04W 8/18* (2013.01); *H04W 12/06* (2013.01); *H04W 48/02* (2013.01); *H04W 48/04* (2013.01); *H04W 48/18* (2013.01)

(58) Field of Classification Search
CPC ..... H04W 88/06; H04W 12/06; H04W 76/18; H04W 8/18
See application file for complete search history.

(56) References Cited

U.S. PATENT DOCUMENTS

| | | | | |
|---|---|---|---|---|
| 2016/0173511 A1* | 6/2016 | Bratspiess | ............ | H04L 41/145 726/23 |
| 2016/0316512 A1* | 10/2016 | Dandra | ................. | H04W 76/18 |
| 2016/0373928 A1* | 12/2016 | Devarayanigari | .... | H04W 12/06 |
| 2017/0215126 A1* | 7/2017 | Moisanen | ............ | H04W 48/08 |

OTHER PUBLICATIONS

"3rd Generation Partnership Project; Technical Specification Group Core Network and Terminals; Non-Access-Stratum (NAS) functions related to Mobile Station (MS) in idle mode (Release 14)", 3GPP Standard ; Technical Specification; 3GPP TS 23.122, 3rd Generation Partnership Project (3GPP), Mobile Competence Centre, 650, Route Des Lucioles, F-06921 Sophia-Antipolis Cedex, France, vol. CT WG1, No. V14.3.0, Jun. 15, 2017, pp. 1-53, XP051298505, [retrieved on Jun. 15, 2017].

3rd Generation Partnership Project; Technical Specification Group Core Network and Terminals; Non-Access-Stratum (NAS) protocol for Evolved Packet System (EPS); Stage 3 (Release 14), 3GPP Standard; Technical Specification; 3GPP TS 24.301, 3rd Generation Partnership Project (3GPP), Mobile Competence Centre, 650, Route Des Lucioles, F-06921 Sophia-Antipolis Cedex, France, vol. CT WG1, No. V14.4.0, Jun. 16, 2017, XP051298653, pp. 1-486, [retrieved on Jun. 16, 2017].

International Search Report and Written Opinion—PCT/US2018/041815—ISA/EPO—Oct. 24, 2018.

Mediatek Inc et al., "Correction of Handling NAS Reject Messages without Integrity Protection", 3GPP Draft; C1-161196-WAS0967, 3rd Generation Partnership Project (3GPP), Mobile Competence Centre, 650, Route Des Lucioles, F-06921 Sophia-Antipolis Cedex, France, vol. CT WG1, No. Jeju (Korea); 20160215-20160219 Feb. 22, 2016, XP051078125, Retrieved from the Internet: URL:http://www.3gpp.org/ftp/tsg_ct/WG1_mm-cc-sm_ex-CN1/TSGC1_96_Jeju/docs/ [retrieved on Feb. 22, 2016], 15 pages.

Qualcomm Incorporated: "Corrections to handling of EFFPLMN File in the SIM and of "Forbidden PLMNs for GPRS service" list", 3GPP Draft; C1-173146 CORRECTIONS_FPLMN, 3rd Generation Partnership Project (3GPP), Mobile Competence Centre, 650, Route Des Lucioles, F-06921 Sophia-Antipolis Cedex, France, vol. CT WG1, No. Krakow (Poland); 20170821—20170825 Aug. 20, 2017, XP051313194, Retrieved from the Internet: URL:http://www.3gpp.org/ftp/Meetings_3GPP_SYNC/CT1/Docs/ [retrieved on Aug. 20, 2017], 5 pages.

\* cited by examiner

FORBIDDEN NETWORK LIST MANAGEMENT

This application claims the benefit of U.S. Provisional Application No. 62/543,473, filed Aug. 10, 2017, the entire content of which is hereby incorporated by reference.

BACKGROUND

Field of the Disclosure

The following relates generally to wireless communication, and more specifically to management of a forbidden network list for a user equipment (UE).

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. A wireless multiple-access communications system may include a number of base stations or network access nodes, each simultaneously supporting communication for multiple communication devices, which may be otherwise known as user equipment (UE).

A non-access stratum (NAS) layer is a set of protocols used to convey non-radio signaling between a UE and a mobility management entity (MME) for access to a network (such as a Long Term Evolution (LTE) network or an evolved universal mobile telephone system (UMTS) terrestrial radio access network (E-UTRAN)). The main functions of the protocols that are a part of the NAS may include the support of UE mobility, evolved packet system (EPS) bearer management, authentication, security control, and connection management. A UE may communicate with the NAS via messages transmitted between the UE and the NAS. Typically, a first NAS message between a UE and an MME may be an attach request, though other message types may include a service request or a connectivity request message.

The initial messages sent between a UE and an MME may be unprotected. Thus, the unprotected NAS messages may be intercepted and exploited by attackers such as a rogue base station. In another instance, the rogue base station may launch a denial of service (DoS) attack on the UE.

SUMMARY

The described techniques relate to improved methods, systems, devices, or apparatuses that support management of a forbidden network list on a subscriber identity module (SIM) in a user equipment (UE) in accordance with various aspects of the present disclosure.

A method of wireless communication is described. The method may include receiving a message from a visited network, determining that the visited network is in a first forbidden network list, wherein the first forbidden network list resides on the UE, outside a subscriber identity module (SIM), determining a value of a counter associated with the visited network in response to the visited network being in the first forbidden network list, incrementing the counter associated with the visited network in response to the visited network being in the first forbidden network, in response to the value of the counter being equal to a maximum counter value: deleting the visited network from the first forbidden network list and adding the visited network to a second forbidden network list, wherein the second forbidden network list resides in the SIM.

An apparatus for wireless communication is described. The apparatus may include means for receiving a message from a visited network, means for determining that the visited network is in a first forbidden network list, wherein the first forbidden network list resides on a user equipment (UE), outside a subscriber identity module (SIM), means for determining a value of a counter associated with the visited network in response to the visited network being in the first forbidden network list, means for incrementing the counter associated with the visited network in response to the visited network being in the first forbidden network, in response to the value of the counter being equal to a maximum counter value: means for deleting the visited network from the first forbidden network list and means for adding the visited network to a second forbidden network list, wherein the second forbidden network list resides in the SIM.

Another apparatus for wireless communication is described. The apparatus may include a processor, memory in electronic communication with the processor, and instructions stored in the memory. The instructions may be executable by the processor to cause the apparatus to receive a message from a visited network, determine that the visited network is in a first forbidden network list, wherein the first forbidden network list resides on a user equipment (UE), outside a subscriber identity module (SIM), determine a value of a counter associated with the visited network in response to the visited network being in the first forbidden network list, increment the counter associated with the visited network in response to the visited network being in the first forbidden network; in response to the value of the counter being equal to a maximum counter value: delete the visited network from the first forbidden network list and add the visited network to a second forbidden network list, wherein the second forbidden network list resides in the SIM.

A non-transitory computer readable medium storing code for wireless communication is described. The code may include instructions executable by a processor receive a message from a visited network, determine that the visited network is in a first forbidden network list, wherein the first forbidden network list resides on a user equipment (UE), outside a subscriber identity module (SIM), determine a value of a counter associated with the visited network in response to the visited network being in the first forbidden network list, increment the counter associated with the visited network in response to the visited network being in the first forbidden network; in response to the value of the counter being equal to a maximum counter value: delete the visited network from the first forbidden network list and add the visited network to a second forbidden network list, wherein the second forbidden network list resides in the SIM.

DETAILED DESCRIPTION

Figure 1:
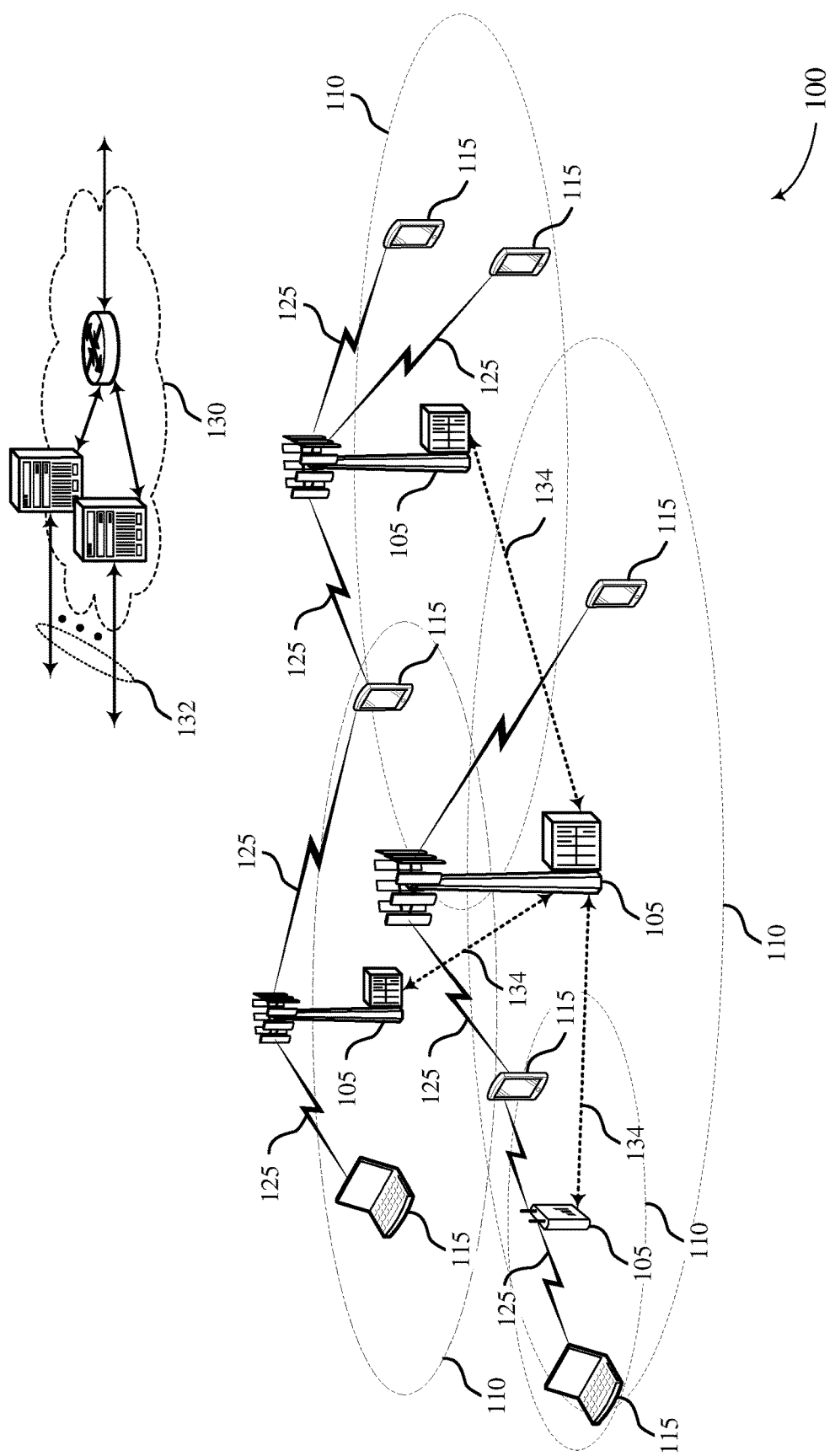
FIG. 1 illustrates an example of a system for wireless communication.

A non-access stratum (NAS) layer is a set of protocols used to convey non-radio signaling between a UE and a mobility management entity (MME) for access to a network (such as a Long Term Evolution (LTE) network or an evolved universal mobile telephone system (UMTS) terrestrial radio access network (E-UTRAN)). The main functions of the protocols that are a part of the NAS may include the support of UE mobility, evolved packet-switched system (EPS) bearer management, authentication, security control, and connection management. A UE may communicate with the NAS via messages transmitted between the UE and the NAS. Typically, a first NAS message between a UE and an MME may be an attach request, though other message types may include a service request or a connectivity request message. If the UE is new to the network the MME may also ask for the UE's identity (e.g., an international mobile subscriber identify (IMSI)).

When a UE is switched on, it attempts to make contact with a public land mobile network (PLMN). A PLMN may be identified by a mobile country code (MCC) and a mobile network code (MNC). The particular PLMN to be contacted may be selected either automatically or manually. The UE looks for a suitable cell of the chosen PLMN and chooses that cell to provide available services and tunes to its control channel. This choosing, or selection, is known as "camping on the cell". The term "cell" refers to a logical communication entity used for communication with a base station (e.g., over a carrier) and may be associated with an identifier for distinguishing neighboring cells (e.g., a physical cell identifier (PCID), a virtual cell identifier (VCID)) operating via the same or a different carrier. The UE may then register its presence in the registration area of the chosen cell if necessary, by means of a location registration (LR), general packet radio service (GPRS) attach, or IMSI attach procedure. If the UE loses coverage of a cell, or find a more suitable cell, it reselects onto the most suitable cell of the selected PLMN and camps on that cell. If the new cell is in a different registration area, an LR request is performed. If the UE loses coverage of a PLMN, either a new PLMN is selected automatically, or an indication of which PLMNs are available is given to the user, so that a manual selection can be made.

The UE normally operates on its home PLMN (HPLMN) or equivalent home PLMN (EHPLMN). However, a visited PLMN (VPLMN) may be selected, e.g., if the UE loses coverage from HPLMN or EHPLMN. VPLMN is a PLMN different from the HPLMN (if the EHPLMN list is not present or is empty) or different from an EHPLMN (if the EHPLMN list is present). To prevent repeated attempts to have roaming service on a not allowed area, for example, local area (LA) or tracking area (TA), when the UE is informed that an area is forbidden, the LA or TA is added to a list of "forbidden location areas for roaming" or "forbidden tracking areas for roaming" respectively which is stored in the UE. These lists, if existing, are deleted when the UE is switched off or when the SIM is removed. If a message with cause value "PLMN not allowed" is received by the UE in response to an LR request from a VPLMN, that VPLMN is added to a list of "forbidden PLMNs" in the SIM of the UE and thereafter that VPLMN will not be accessed by the UE, for example, when in automatic mode. Cause value "PLMN not allowed" is also referred to as EPS mobility management (EMM) cause #11, which is sent to the UE if the UE requests service, or if the network initiates a detach request, in a PLMN where the UE, by subscription or due to operator determined barring, is not allowed to operate. That PLMN is removed from the "forbidden PLMNs" list if, after a subsequent manual selection of the PLMN, there is a successful LR. This list is retained when the UE is switched off or the SIM is removed. The HPLMN (if the EHPLMN list is not present or is empty) or the EHPLMN (if the EHPLMN list is present) shall not be stored on the list of forbidden PLMNs.

The initial messages sent between a UE and an MME may be unprotected. Thus, the unprotected NAS messages may be intercepted and exploited by attackers such as a rogue base station. In another instance, the rogue base station may launch a denial of service (DoS) attack on the UE. For example, a rogue base station may receive a tracking area update (TAU) request message in message and the rogue base station may reject the TAU request from the UE in reject message which may cause the UE to consider a subscriber identity module (SIM) as invalid for EPS services and non-EPS services until the UE switches off or the card containing the SIM is removed.

Accordingly, the UE may include procedures to mitigate such DoS attack by a rogue base station. UE may maintain a temporary forbidden network list, such as temporary forbidden PLMN (T-FPLMN) list, which resides outside the SIM, and update a forbidden network list, such as elementary file forbidden PLMN (EF-FPLMN) list, which resides on the SIM, only under certain conditions.

Aspects of the disclosure are initially described in the context of a wireless communications system. Specific examples are described for managing a forbidden network list on a subscriber identity module (SIM) in a user equipment (UE). Aspects of the disclosure are further illustrated by and described with reference to apparatus diagrams, system diagrams, and flowcharts that relate to management of a forbidden network list on a SIM in a UE.

FIG. 1 illustrates an example of a wireless communications system 100 that supports management of a forbidden network list on a subscriber identity module (SIM) in a user equipment (UE) in accordance with various aspects of the present disclosure. The wireless communications system 100 includes base stations 105, UEs 115, and a core network 130. In some examples, the wireless communications system 100 may be a Global System for Mobile (GSM) network, a Universal Mobile Telecommunications System (UMTS) network, a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or a Machine-Type Communication (MTC) device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

Communications between a UE 115 and a core network 130 may include non-access stratum (NAS) communications. As explained herein, a NAS layer is a functional layer used in the protocol stacks between a UE 115 and a core network 130, and may be implemented by an MME located at the core network 130. In some examples, a first NAS message between a UE 115 and an MME may be an attach request. The initial messages sent between a UE and an MME may be unprotected. Thus, the unprotected NAS messages may be intercepted and exploited by attackers such as a rogue base station. In another instance, the rogue base station may launch a denial of service (DoS) attack on the UE. For example, a rogue base station may receive a tracking area update (TAU) request message in message and the rogue base station may reject the TAU request from the UE in reject message which may cause the UE to consider a subscriber identity module (SIM) as invalid for EPS services and non-EPS services until the UE switches off or the card containing the SIM is removed.

Figure 2:
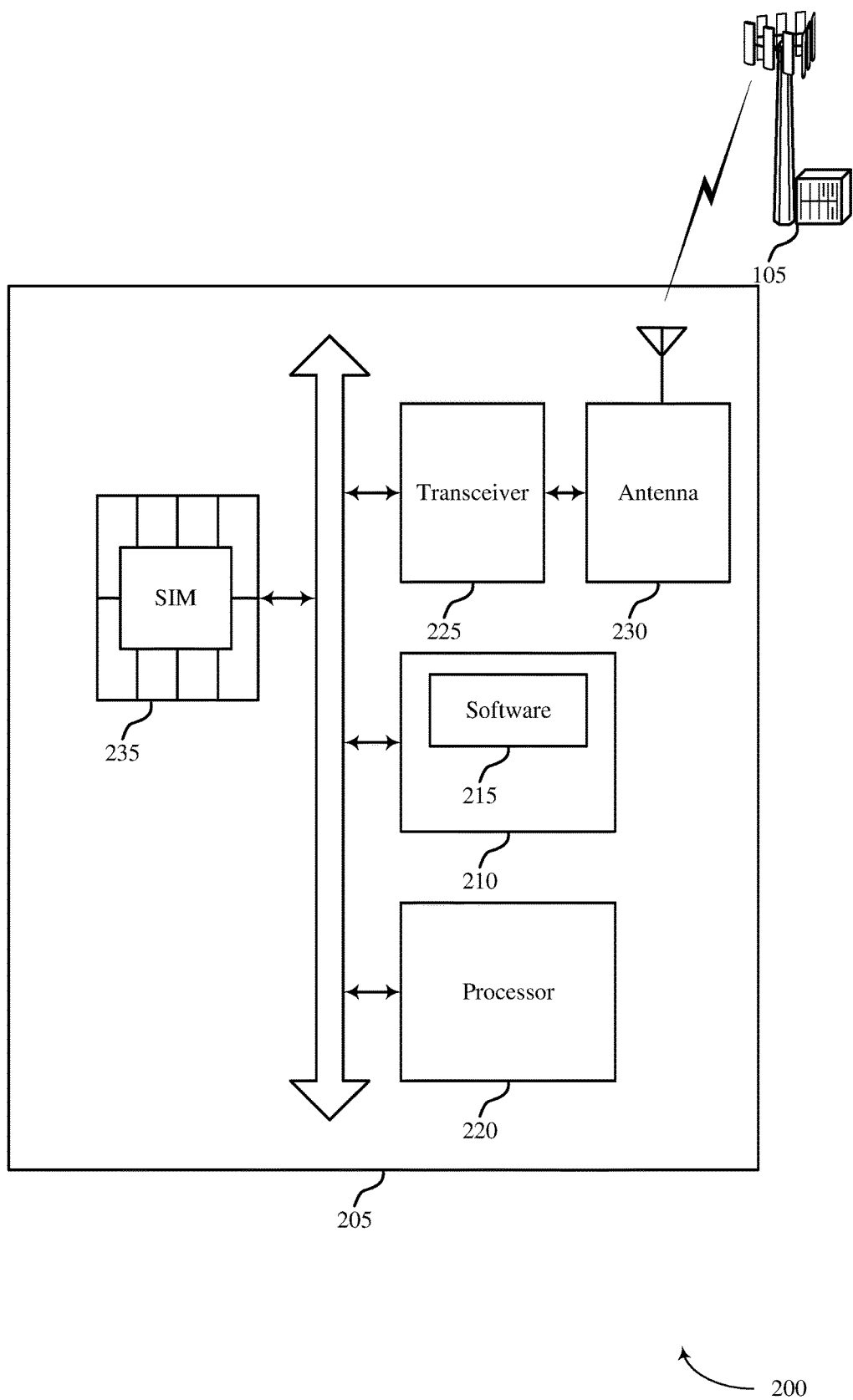
FIG. 2 shows block diagrams of a device that supports management of a forbidden network list on a SIM in a UE in accordance with aspects of the present disclosure.

FIG. 2 shows a block diagram 200 of a wireless device 205 that supports management of a forbidden network list on a subscriber identity module (SIM) in a user equipment (UE) in accordance with aspects of the present disclosure. Wireless device 205 may be an example of aspects of a UE 115 as described herein. Wireless device 205 may include memory 210, processor 220, transceiver 225, antenna 230 and SIM 235. Each of these modules may communicate, directly or indirectly, with one another (e.g., via one or more buses).

The memory 210 may include random access memory (RAM) and read only memory (ROM). The memory 210 may store computer-readable, computer-executable software including instructions that, when executed, cause the processor to perform various functions described herein. In some cases, the software 215 may not be directly executable by the processor but may cause a computer (e.g., when compiled and executed) to perform functions described herein.

The transceiver 225 may communicate bi-directionally, via one or more antennas, wired, or wireless links, with one or more networks, as described above. For example, the transceiver 225 may communicate bi-directionally with a base station 105 or a UE 115. The transceiver 225 may also include a modem to modulate the packets and provide the modulated packets to the antennas for transmission, and to demodulate packets received from the antennas.

The processor 220 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 220 may be configured to operate a memory array using a memory controller. In other cases, a memory controller may be integrated into processor 220. Processor 220 may be configured to execute computer-readable instructions stored in a memory to perform various functions (e.g., functions or tasks supporting management of a forbidden network list on a SIM in a UE in accordance with aspects of the present disclosure). The term processor is used herein in accordance with its meaning as structure.

The software 215 may include code to implement aspects of the present disclosure, including code to support management of a forbidden network list on a SIM in a UE in accordance with aspects of the present disclosure. Software 215 may be stored in a non-transitory computer-readable medium such as system memory or other memory. In some cases, the software 215 may not be directly executable by the processor but may cause a computer (e.g., when compiled and executed) to perform functions described herein.

In some cases, the wireless device may include a single antenna 230. However, in some cases the device may have more than one antenna 230, which may be capable of concurrently transmitting or receiving multiple wireless transmissions.

The SIM 235 may be an integrated circuit (IC) that securely stores an international mobile subscriber identify (IMSI) and the related key used to identify and authenticate a UE 115. SIM 235 may also contain a unique serial number, e.g., an integrated circuit card identification (ICCID), security authentication and ciphering information, temporary information related to the local network, a list of the services, a personal identification number (PIN), and a PIN unblocking key (PUK) for PIN unlocking. In some cases, SIM 235 may be a circuit embedded in a removable card or directly embedded on the UE. SIM may be also referred to as universal subscriber identity module (USIM) in LTE network.

Figure 3:
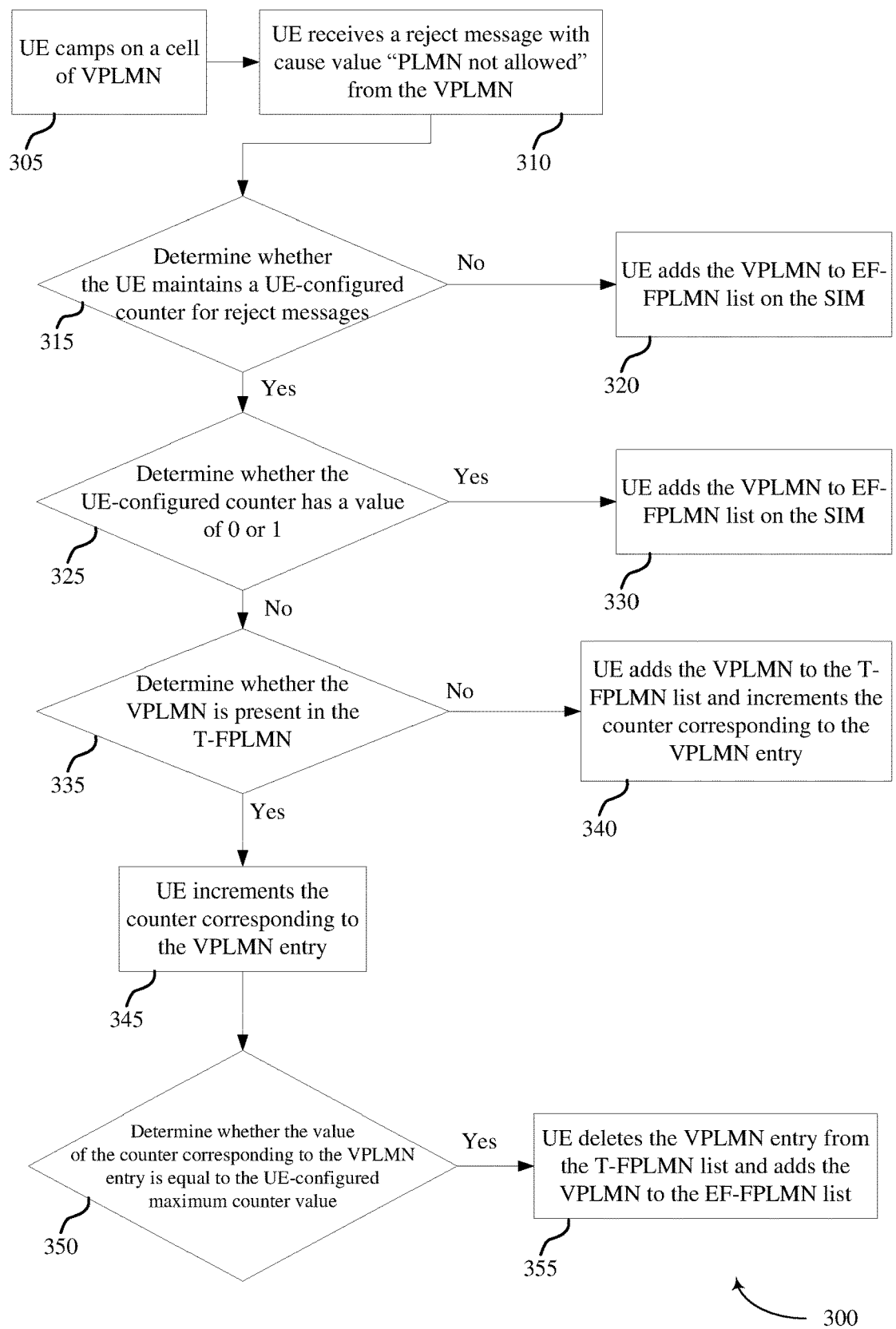
FIG. 3 illustrates methods for management of a forbidden network list on a SIM in a UE in accordance with aspects of the present disclosure.

FIG. 3 shows a flowchart illustrating a method 300 for management of a forbidden network list on a subscriber identity module (SIM) in a user equipment (UE) in accordance with aspects of the present disclosure. The operations of method 300 may be implemented by a UE 115 or its components as described herein. For example, the operations of method 300 may be performed by a processor as described with reference to FIG. 2. In some examples, a UE 115 may execute a set of codes to control the functional elements of the device to perform the functions described below. Additionally or alternatively, the UE 115 may perform aspects of the functions described below using special-purpose hardware.

At block 305 the UE 115 may camp on a cell of a visited PLMN (VPLMN). Camping on a cell of a VPLMN refers to the UE searching for a suitable cell of the VPLMN, choosing (or selecting) that cell to provide available services, and tuning to its control channel.

At block 310 the UE receives a reject message with cause value "PLMN not allowed" (also referred to as EMM cause #11), which indicates that the VPLMN is not allowed, from the VPLMN. The reject message may include Attach Reject, tracking area update (TAU) Reject, or Service Reject messages. Further, the reject message may be a non-integrity protected or plain reject message.

At block 315 the UE determines whether it maintains a UE-configured counter for reject messages. The UE-configured counter may be any PLNM-specific counter maintained by the UE. At block 320, if the UE does not maintain a UE-configured counter for reject messages, the UE adds the VPLMN to an elementary file forbidden PLMN (EF-FPLMN) list, which resides on the SIM of the UE. For example, the UE may electronically store or write the VPLMN identification in the EF-FPLMN list.

At block 325, after the UE determines that it maintains a UE-configured counter for reject messages, the UE determines whether the UE-configured counter has a value of 0 or 1. At block 330, if the UE-configured counter has a value of 0 or 1, the UE adds the VPLMN to the EF-FPLMN list, which resides on the SIM of the UE. For example, the UE may electronically store or write the VPLMN identification in the EF-FPLMN list on the SIM of the UE. At block 335, if the UE-configured counter has a value of 2 or greater, the UE determines whether the VPLMN is present in the temporary forbidden PLMN (T-FPLMN) list in the UE's memory outside the SIM. For example, the UE may electronically search for the VPLMN identification in the T-FPLMN list in the UE's memory.

At block 340, if the VPLMN is not found in the T-FPLMN list in the UE's memory, the UE adds the VPLMN to the T-FPLMN list in the UE's memory and increments the counter corresponding to that VPLMN entry. At block 345, if the VPLMN is found in the T-FPLMN list in the UE's memory, the UE increments the counter corresponding to that VPLMN entry.

At block 350 the UE determines whether the value of the counter corresponding to the VPLMN entry is equal to the UE-configured maximum counter value. If the value of the counter corresponding to the VPLMN entry is not equal to the UE-configured maximum counter value, no action is further taken. At block 355, if the value of the counter corresponding to the VPLMN entry is equal to the UE-configured maximum counter value, the UE deletes the VPLMN entry from the T-FPLMN list in the UE's memory and adds the VPLMN to the EF-FPLMN list on the SIM.

Figure 4:
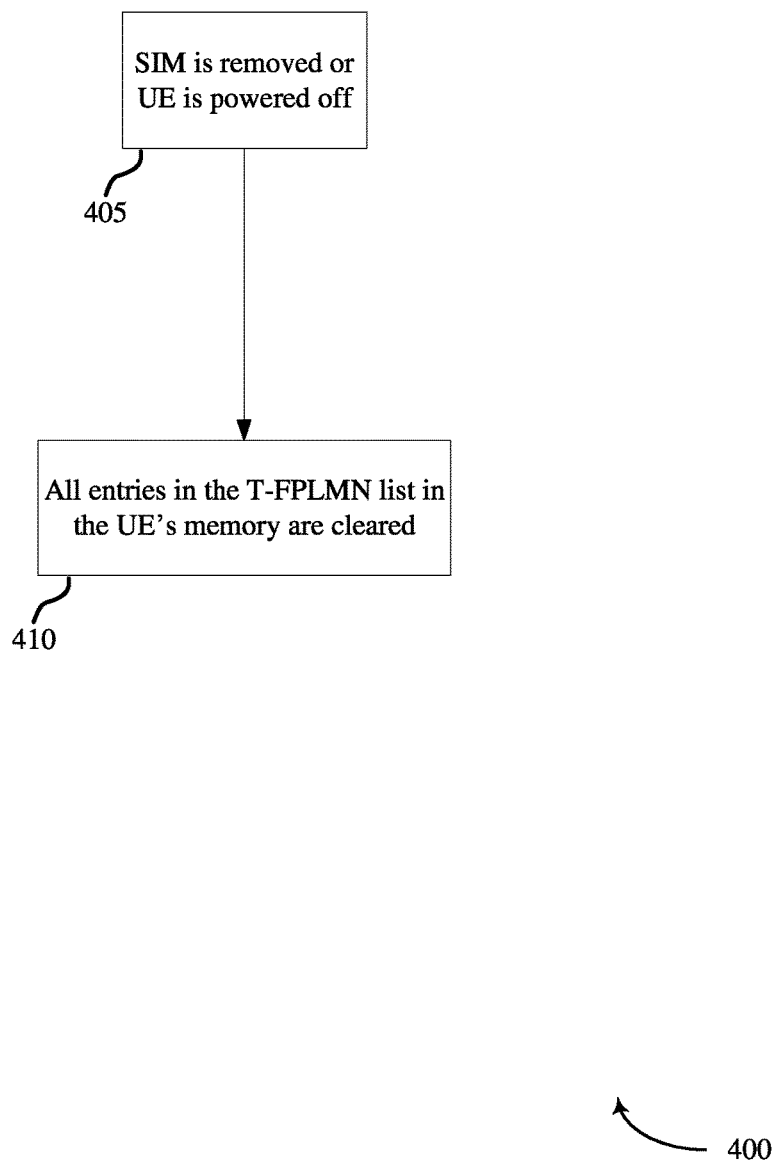
FIG. 4 illustrates methods for management of a forbidden network list when the UE powered off or the SIM is removed in accordance with aspects of the present disclosure.

FIG. 4 shows a flowchart illustrating a further method 400 for management of a forbidden network list on a subscriber identity module (SIM) in a user equipment (UE) in accordance with aspects of the present disclosure. The operations of method 400 may be implemented by a UE 115 or its components as described herein. For example, the operations of method 400 may be performed by a processor as described with reference to FIG. 2. In some examples, a UE 115 may execute a set of codes to control the functional elements of the device to perform the functions described below. Additionally or alternatively, the UE 115 may perform aspects of the functions described below using special-purpose hardware.

At block 405, the SIM is removed or UE is powered off. At block 410, all entries in the T-FPLMN list in the UE's memory are cleared, or deleted, when the SIM is removed or UE is powered off. Hence, the entries in the T-FPLMN list does not get stored on the SIM's EF-FPLMN list at the time of the removal or power off, or afterwards.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, by a user equipment (UE), for wireless communication, comprising:

receiving a message from a visited network;
determining that the visited network is in a first forbidden network list, wherein the first forbidden network list resides on the UE, outside a subscriber identity module (SIM);
determining a value of a counter associated with the visited network in response to the visited network being in the first forbidden network list;
incrementing the counter associated with the visited network in response to the visited network being in the first forbidden network;
in response to the value of the counter being equal to a maximum counter value:
  deleting the visited network from the first forbidden network list; and
  adding the visited network to a second forbidden network list, wherein the second forbidden network list resides in the SIM; and
deleting all entries in the first forbidden network list in response to the SIM being removed from the UE or the UE being powered off.

2. The method of claim 1, further comprising:
camping on the visited network, wherein said camping comprises:
  searching for a cell in the visited network;
  selecting the cell; and
  tuning a control channel of the UE to the cell.

3. The method of claim 1, further comprising:
determining that the UE does not maintain a UE-configured counter; and
adding the visited network to the second forbidden network list.

4. The method of claim 1, further comprising:
determining that the UE maintains a UE-configured counter;
determining that the UE-configured counter has a value of 0 or 1; and
adding the visited network to the second forbidden network list.

5. The method of claim 1, wherein:
the visited network is different from a home network.

6. The method of claim 1, wherein:
the message comprises a non-integrity protected reject message, and further includes a cause value indicating that the visited network is not allowed.

7. The method of claim 6, wherein:
the cause value comprises an evolved packet system (EPS) mobility management (EMM) cause #11.

8. The method of claim 1, wherein:
the message comprises an attach reject message, a tracking area update (TAU) reject message, or a service reject message.

9. An apparatus for wireless communication, comprising:
a processor;
memory in electronic communication with the processor; and
instructions stored in the memory and operable, when executed by the processor, to cause the apparatus to:
  receive a message from a visited network;
  determine that the visited network is in a first forbidden network list, wherein the first forbidden network list resides on a user equipment (UE), outside a subscriber identity module (SIM);
  determine a value of a counter associated with the visited network in response to the visited network being in the first forbidden network list;
  increment the counter associated with the visited network in response to the visited network being in the first forbidden network;
  in response to the value of the counter being equal to a maximum counter value:
    delete the visited network from the first forbidden network list; and
    add the visited network to a second forbidden network list, wherein the second forbidden network list resides in the SIM; and
  delete all entries in the first forbidden network list in response to the SIM being removed from the UE or the UE being powered off.

10. The apparatus of claim 9, wherein the instructions are further executable by the processor to cause the apparatus to:
camp on the visited network, wherein said camping comprises:
  searching for a cell in the visited network;
  selecting the cell; and
  tuning a control channel of the UE to the cell.

11. The apparatus of claim 9, wherein the instructions are further executable by the processor to cause the apparatus to:
determine that the UE does not maintain a UE-configured counter; and
add the visited network to the second forbidden network list.

12. The apparatus of claim 9, wherein the instructions are further executable by the processor to cause the apparatus to:
determine that the UE maintains a UE-configured counter;
determine that the UE-configured counter has a value of 0 or 1; and
add the visited network to the second forbidden network list.

13. The apparatus of claim 9, wherein:
the visited network is different from a home network.

14. The apparatus of claim 9, wherein:
the message comprises a non-integrity protected reject message, and further includes a cause value indicating that the visited network is not allowed.

15. The apparatus of claim 14, wherein:
the cause value comprises an evolved packet system (EPS) mobility management (EMM) cause #11.

16. The apparatus of claim 9, wherein:
the message comprises an attach reject message, a tracking area update (TAU) reject message, or a service reject message.

17. An apparatus for wireless communication, comprising:
means for receiving a message from a visited network;
means for determining that the visited network is in a first forbidden network list, wherein the first forbidden network list resides on a user equipment (UE), outside a subscriber identity module (SIM);
means for determining a value of a counter associated with the visited network in response to the visited network being in the first forbidden network list;
means for incrementing the counter associated with the visited network in response to the visited network being in the first forbidden network;
in response to the value of the counter being equal to a maximum counter value:
  means for deleting the visited network from the first forbidden network list; and
  means for adding the visited network to a second forbidden network list, wherein the second forbidden network list resides in the SIM; and means for deleting all entries in the first forbidden network list in response to the SIM being removed from the UE or the UE being powered off.

18. The apparatus of claim 17, further comprising:
means for camping on the visited network, wherein said camping comprises:
means for searching for a cell in the visited network;
means for selecting the cell; and
means for tuning a control channel of the UE to the cell.

19. The apparatus of claim 17, further comprising:
means for determining that the UE does not maintain a UE-configured counter; and
means for adding the visited network to the second forbidden network list.

20. The apparatus of claim 17, further comprising:
means for determining that the UE maintains a UE-configured counter;
means for determining that the UE-configured counter has a value of 0 or 1; and
means for adding the visited network to the second forbidden network list.

21. The apparatus of claim 17, wherein:
the visited network is different from a home network.

22. The apparatus of claim 17, wherein:
the message comprises a non-integrity protected reject message, and further includes a cause value indicating that the visited network is not allowed.

23. The apparatus of claim 22, wherein:
the cause value comprises an evolved packet system (EPS) mobility management (EMM) cause #11.

24. The apparatus of claim 17, wherein:
the message comprises an attach reject message, a tracking area update (TAU) reject message, or a service reject message.

25. A non-transitory computer readable medium storing code for wireless communication, the code comprising instructions executable by a processor to:
receive a message from a visited network;
determine that the visited network is in a first forbidden network list, wherein the first forbidden network list resides on a user equipment (UE), outside a subscriber identity module (SIM);
determine a value of a counter associated with the visited network in response to the visited network being in the first forbidden network list;
increment the counter associated with the visited network in response to the visited network being in the first forbidden network;
in response to the value of the counter being equal to a maximum counter value:
delete the visited network from the first forbidden network list; and
add the visited network to a second forbidden network list, wherein the second forbidden network list resides in the SIM; and
delete all entries in the first forbidden network list in response to the SIM being removed from the UE or the UE being powered off.

26. The non-transitory computer-readable medium of claim 25, wherein the instructions are further executable by the processor to cause the apparatus to:
camp on the visited network, wherein said camping comprises:
searching for a cell in the visited network;
selecting the cell; and
tuning a control channel of the UE to the cell.

27. The non-transitory computer-readable medium of claim 25, wherein the instructions are further executable by the processor to cause the apparatus to:
determine that the UE does not maintain a UE-configured counter; and
add the visited network to the second forbidden network list.

28. The non-transitory computer-readable medium of claim 25, wherein the instructions are further executable by the processor to cause the apparatus to:
determine that the UE maintains a UE-configured counter;
determine that the UE-configured counter has a value of 0 or 1; and
add the visited network to the second forbidden network list.

29. The non-transitory computer-readable medium of claim 25, wherein:
the visited network is different from a home network.

30. The non-transitory computer-readable medium of claim 25, wherein:
the message comprises a non-integrity protected reject message, and further includes a cause value indicating that the visited network is not allowed.

31. The non-transitory computer-readable medium of claim 30, wherein:
the cause value comprises an evolved packet system (EPS) mobility management (EMM) cause #11.

32. The non-transitory computer-readable medium of claim 25, wherein:
the message comprises an attach reject message, a tracking area update (TAU) reject message, or a service reject message.

* * * * *